Dec. 29, 1964   G. H. ECKELS   3,163,398
POLE PULLING JACK
Filed April 16, 1962   4 Sheets-Sheet 1
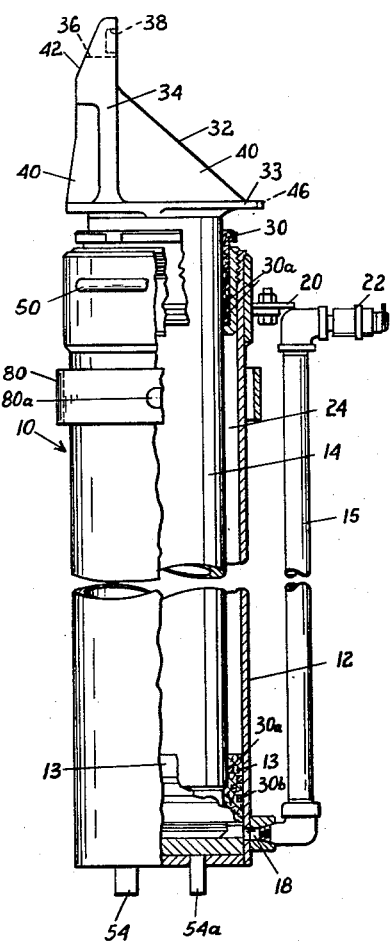
Fig. 1
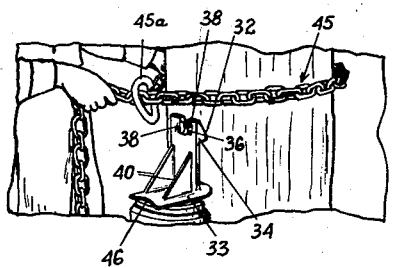
Fig. 2
Fig. 3
INVENTOR.
GEORGE H. ECKELS
BY
Teare, Fetzer & Teare
ATTORNEYS Dec. 29, 1964  G. H. ECKELS  3,163,398
POLE PULLING JACK
Filed April 16, 1962  4 Sheets-Sheet 2
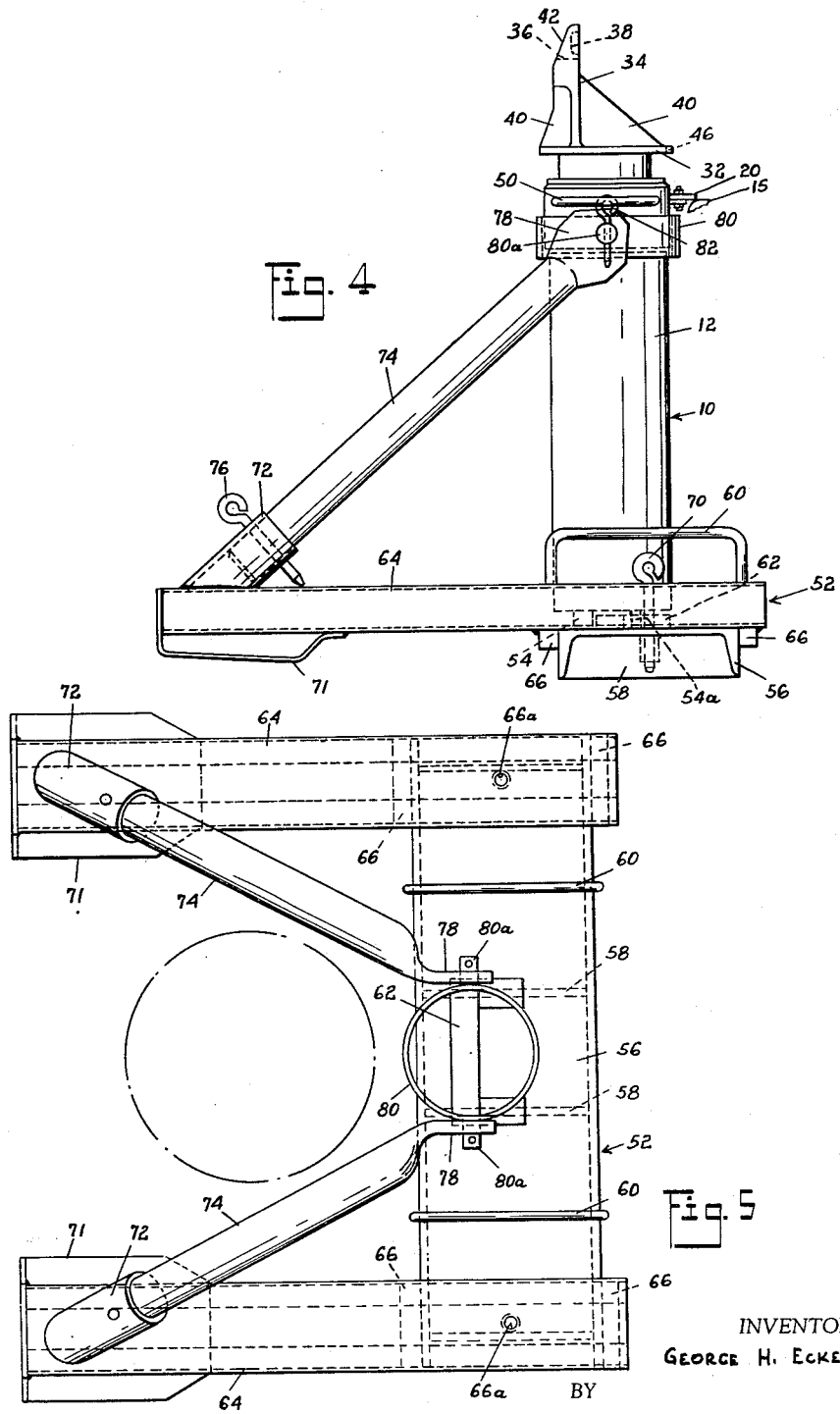
INVENTOR.
GEORGE H. ECKELS
BY
Teare, Fetzer & Teare
ATTORNEYS Dec. 29, 1964  G. H. ECKELS  3,163,398
POLE PULLING JACK
Filed April 16, 1962  4 Sheets-Sheet 3
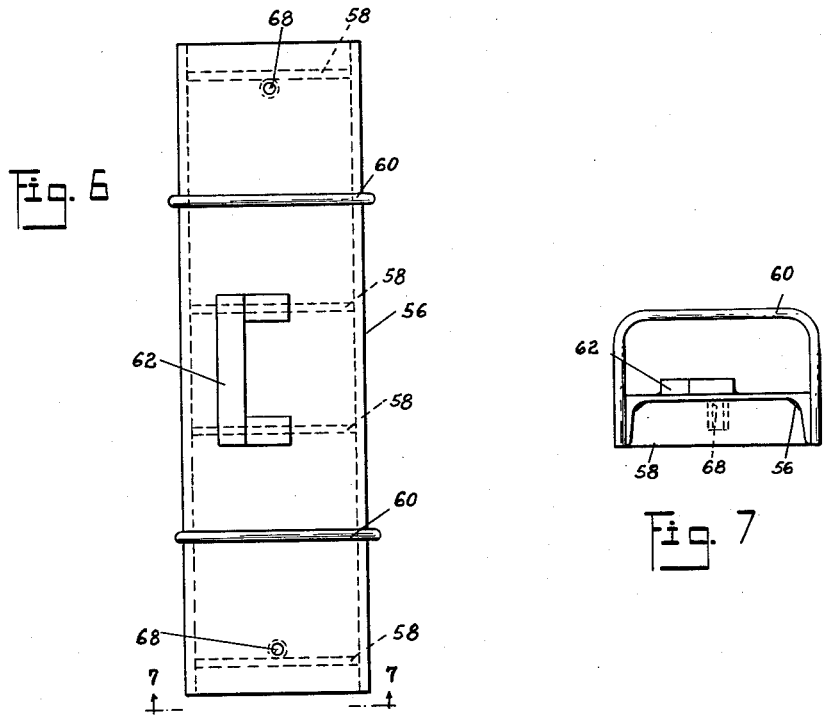
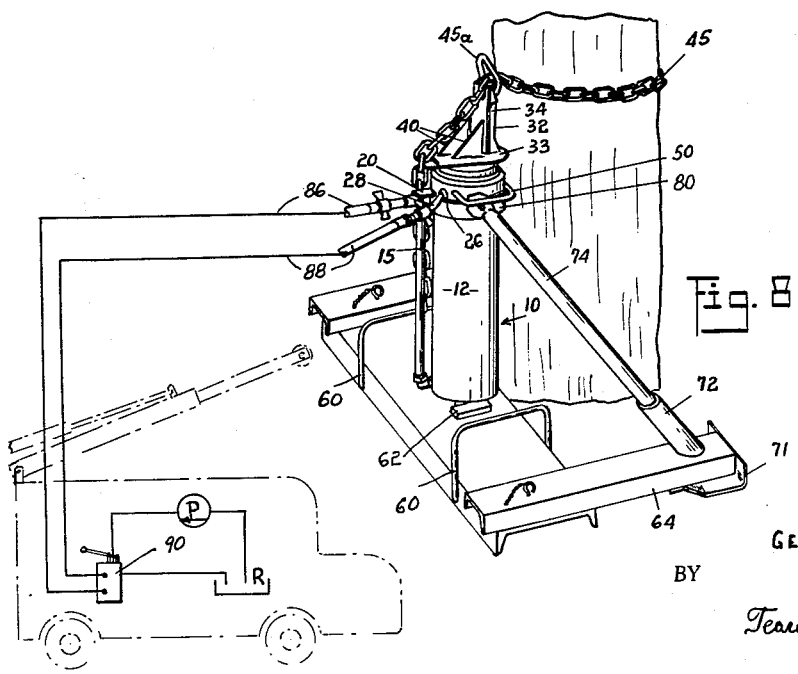
INVENTOR.
GEORGE H. ECKELS
BY
Teare, Fetzer & Teare
ATTORNEYS Dec. 29, 1964  G. H. ECKELS  3,163,398
POLE PULLING JACK Filed April 16, 1962  4 Sheets-Sheet 4

INVENTOR.
BY GEORGE H. ECKELS
Teare, Fetzer & Teare
ATTORNEYS

United States Patent Office 3,163,398
Patented Dec. 29, 1964

3,163,398
POLE PULLING JACK
George H. Eckels, Lakewood, Ohio, assignor, by mesne assignments, to The Ohio Brass Company, Mansfield, Ohio, a corporation of New Jersey
Filed Apr. 16, 1962, Ser. No. 187,689
5 Claims. (Cl. 254—29)

This invention relates in general to means for removing or pulling poles or the like from the ground, and more particularly to a portable fluid powered pole jack.

In the utility field of endeavor, it is often times necessary to remove a pole, such as a utility pole, from its implanted position in the ground. Often times in the past this was accomplished by digging around the pole, and then using the conventional well-known derrick on a utility truck, to wrench the pole from the ground. If the pole had been sawed of a few feet above ground level, the removal operation was even more difficult. Such conventional procedures are time consuming, necessitating considerable man hours of work, and thus are costly.

The present invention provides a portable, fluid powered pole jack which may be readily set up by a single workman, and which may be expeditiously coupled to a source of fluid power, for instance the source of fluid power conventionally found on a utility truck, for expeditiously and quickly lifting or pulling a pole from its supported position in the ground, and one which is highly effective for use with pole butts, or in other words poles that have been sawed off a few feet above ground level.

Accordingly, an object of this invention is to provide a novel, portable jack, for expeditiously removing poles and pole butts from the ground.

Another object of the invention is to provide a novel, portable, fluid powered pole jack which may be readily carried, set-up, and operated by a single workman, and which will quickly and effectively lift a pole or pole butt out of implanted relationship in the ground.

A more specific object of the invention is to provide a novel, portable, fluid powered pole jack comprising a detachable base assembly and a fluid powered ram adapted for mounting on the base assembly, and wherein such ram has means coupled thereto for quickly attaching a flexible gripping member to the ram, which member is adapted to encircle a pole to be lifted from its planted position in the ground, and including means on said jack to compensate for uneven ground on which it may be used.

Another object of the invention is to provide a novel portable, fluid powered pole jack which is rugged in construction, which is highly effective in lifting or pulling a pole or a pole butt from its planted position in the ground, and which may be readily used and coupled to a source of fluid power as conventionally found on a utility-type truck, for greatly expediting the removal of the pole from the ground.

Other objects and advantages of the invention will be apparent from the following description taken in conjunction with the accompanying drawings, wherein:

FIG. 1 is a side elevational, partially sectioned view of the fluid powered ram member of the pole jack mechanism of the invention;

FIG. 2 is a reduced size, fragmentary, generally rear end perspective view of the head member on the ram, which is adapted for detachable coupling to a flexible member, such as a link chain, for gripping the pole or pole butt circumferentially thereof, and lifting it from its implanted condition in the ground;

FIG. 3 is an elevational broken view of a section of the aforementioned flexible member, or more particularly the link chain member, which is adapted for coaction with the pole jack, to lift a pole from the ground;

FIG. 4 is a side elevational view of the ram member of FIG. 1, as assembled with a detachable base assembly, such base assembly being adapted to support the ram in position adjacent to the pole;

FIG. 5 is a top plan view of the base assembly of FIG. 4, with the ram having been eliminated in the interests of clarity;

FIG. 6 is a top plan view of one part of the base assembly of FIGS. 4 and 5;

FIG. 7 is an end elevational view of the FIG. 6 part taken generally along the plane of line 7—7 of FIG. 6;

FIG. 8 is a generally diagrammatic view of the pole jack assembly in position adjacent the butt end of the pole and with the flexible member coacting with the ram, and encircling the pole, and in position ready for lifting of the pole upwardly out of the ground, and diagrammatically illustrating the connection of the fluid powered jack to a utility-type vehicle, for furnishing fluid power to the jack.

Figure 9:
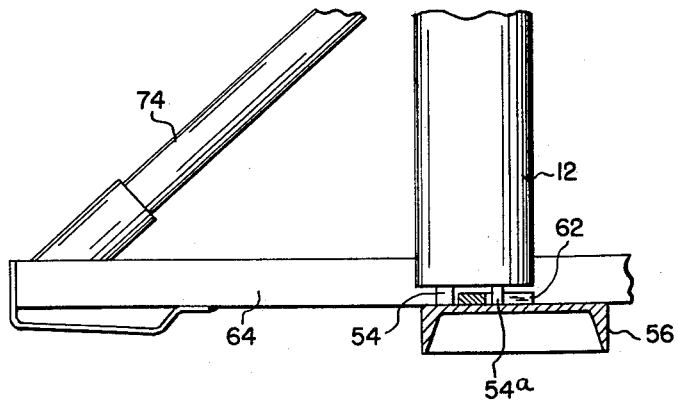
Figure 10:
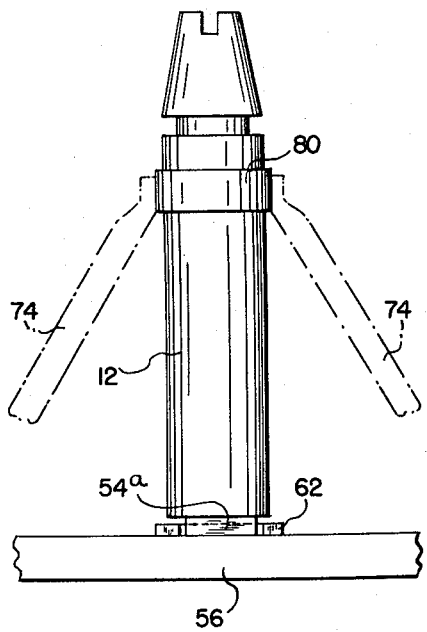

FIG. 9 is a partially sectioned broken view particularly illustrating the lugs on the cylinder of the ram which coact with lug structure on the base assembly, for generally interlocking the ram cylinder to the base assembly;

FIG. 10 is a broken, generally diagrammatic, end elevational view of the lug structure illustrated in FIG. 9 taken generally from the right hand end of FIG. 9.

Referring now again to the drawings, the pole jack includes a generally vertically extending ram 10 comprising a cylinder 12, a piston head 13 disposed in the cylinder, and with the piston head having a piston rod 14 projecting out of the upper end of the cylinder. An external conduit or pipe 15 is provided running along the lengthwise dimension of the cylinder, with the conduit communicating as at 18 with the underside of the piston head. The upper end of the conduit 15 may be attached to the external wall of the cylinder, as by means of a detachable or separable bracket 20. A coupling or fitting 22 may be provided for readily attaching a fluid distributing line to the conduit 15, such as for instance a flexible hose coupled at its other end to a source of pressurized fluid for operating the ram. Chamber 24 of the cylinder above the piston head communicates with port 26 (FIG. 8) which may be provided with a fitting 28 for detachably connecting another fluid distributing line or hose to the ram. The upper end of the ram is preferably provided with a wiper ring 30 (FIG. 1) which coacts with the external surface of the piston rod 14, for preventing dirt or the like from getting inside the cylinder and damaging the seals 30a and piston rings 30b thereof.

Attached to the outer end of piston rod 14 is a jack head 32, which may include a generally horizontally disposed base or shelf portion 33 and a generally upstanding flange portion 34 having a vertical slot 36 (FIG. 2) disposed generally centrally thereof. Adjacent slot 36 on the rearward side of flange 34 there may be provided bevelled recesses 38 for a purpose to be hereinafter set forth. Front and rear web or gussets 40 rigidify flange portion 34, and the upper thickened end or nose of the flange portion 34 may be bevelled as at 42.

The aforementioned vertical slot 36 is adapted to receive a link of the flexible member or chain 45 therein, with the next adjacent link being received in the aforementioned bevelled recesses 38, to hold the chain in locked condition with the head 32. As can be best seen in FIG. 2, the rearward end of the base shelf 33 of the head has an inwardly bevelled edge 46 for effectively holding or positioning the tail end of the chain, and in conjunction with the shelf 33, maintains the chain out of engagement with the piston rod, during extension of the ram, and thus insures that the chain will not damage the hardened surface of the rod. The chain 45 preferably embodies an enlarged link 45a at one end thereof, and with the other end or tail end of the chain being adapted to be fed through the link 45a so that the chain circumferentially grips an associated pole or pole butt when in encircling relation therewith, and as shown for instance in FIG. 8. Such enlarged link 45a may abut against the aforementioned bevelled surface 42 of the jack head 32, intermediate the latter and the pole, and provide a firm support for the jack head against the pole.

The upper end of the cylinder 12 is preferably provided with laterally extending handle portions 50 for conveniently handling the ram, and assembling it with the detachable base assembly 52 (FIGS. 4 and 5). The bottom end of the cylinder may also be provided with lugs 54, 54a for a purpose to be hereinafter set forth.

The base assembly 52 of the jack comprises an elongated transverse section 56 of channel-shaped configuration in end elevation (FIG. 7) having spaced cross ribs 58 on its underside. Handle portions 60 may be provided for conveniently lifting the base assembly, and a raised lug section 62 is provided generally centrally of section 56, for purpose to be hereinafter described.

Leg sections 64 are adapted for mounting on the transverse section 56 as best shown in FIG. 4, with each leg section having lugs 66 on the underside thereof, for fitting in abutting relation to the transverse section 56 when in assembled relation therewith. Each leg section 64 has an opening 66a adapted for alignment with a corresponding opening 68 in the transverse section 56, for receiving pins 70 therethrough, to detachably hold the leg sections in assembled relation with the transverse section. The other ends of the leg sections may be provided with skids 71. Each of the leg sections has a socket 72 projecting diagonally outwardly and upwardly therefrom, for detachably receiving a strut 74. Pins 76 extending through complementary openings in the sockets and struts may detachably hold the struts in assembled relation with the respective socket. The upper end of each strut is preferably flattened as at 78 and pivotally supports a collar member 80, such collar member having trunnions 80a thereon received in complementary openings in the flattened portions 78 of the struts. Pins 82 may detachably hold the collar in assembled relation with the struts.

As best shown in FIG. 4, the ram 10 is adapted to be encircled by the collar 80 at the upper end thereof, and with the lugs 54, 54a on the bottom of the cylinder 12 being adapted to support the ram bottom in somewhat spaced relation to the aforementioned lug structure 62 on the transverse section 56. Thus it will be seen that while the ram is interlocked horizontally with the base assembly, it may be tilted somewhat to compensate for uneven ground on which the base assembly may rest, when in juxtaposed relation to a pole.

As aforementioned, the ram may be conveniently coupled by means of flexible conduit lines 86, 88 to a source of pressurized fluid, and for instance the usual source (pump P and associated reservoir R FIG. 8) of pressurized fluid found on a conventional utility-type of vehicle, for operating the ram and thus lifting the pole out of its implanted relation in the ground. Such conduit lines may be coupled to a conventional directional control valve 90 so that the direction of flow of pressurized fluid can be controlled from the source on the utility vehicle. Upon application of pressurized fluid to, for instance, conduit 15 via line 86, the pressurized fluid would raise the piston rod 14 and associated jack head 32 upwardly, and when the chain 45 is in encircling, gripping, relationship with the pole, the pole is pulled or lifted from the ground.

The pole jack is adapted to be easily handled by a single workman, the whole assembly being of extremely light weight and can be quickly and expeditiously mounted adjacent a pole for removal thereof from the ground. The conduit 15 on the fluid powered ram may readily serve for a handle, whereby a workman can carry the ram up to the base assembly, and assemble the ram with the base assembly. The aforementioned lug structure 54, 54a, 62 on the ram cylinder and on the base assembly respectively, and the strut and pivotal collar structure, interlock the ram to the base assembly, while permitting adjustment of the ram for uneven ground conditions on which the base assembly rests.

From the foregoing discussion and accompanying drawings, it will be seen that the invention provides a novel fluid powered pole jack for expeditious removal of a pole from implanted condition in the ground, and a jack which can be readily and easily handled by a single workman, and assembled in juxtaposed relation with the pole. The invention also provides a pole jack which can be conveniently used with existing utility trucks, and coupled to the conventional source of pressurized fluid on such trucks, for operating the pole jack.

The terms and expressions which have been used are used as terms of description and not of limitation, and there is no intention in the use of such terms and expressions of excluding any equivalents of the features shown, or described, or portions thereof, and it is recognized that various modifications are possible within the scope of the invention claimed.

I claim:

1. A portable pole jack comprising a base assembly, a reciprocal fluid powered ram detachably mounted on said base assembly, means on said ram for interlocking coaction with a flexible member which is adapted to encircle a pole and grip the latter, for lifting the flexible member upwardly upon actuation of said ram, said base assembly comprising a generally U-shaped, in plan view, structure, strut means projecting upwardly from said U-shaped structure, and collar means pivotally mounted on said strut means for rotary movement with respect thereto about a generally horizontal axis through said strut means, said collar means encircling said ram and lug means depending from the ram cylinder into engagement with said base assembly and spacing the ram cylinder from the base assembly.

2. A portable pole jack in accordance with claim 1, wherein said base assembly comprises a rectilinear transverse section and spaced completely separate, leg sections mounted on said transverse section and projecting longitudinally therefrom, means detachably holding said sections in assembled relation, said strut means projecting diagonally upwardly in converging relation from said leg sections and pivotally supporting said collar means directly above said transverse section.

3. A portable pole jack comprising a base assembly, a reciprocal fluid powered ram mounted generally vertically on said base assembly, said ram including a piston and a cylinder, a piston rod projecting outwardly of the upper end of said cylinder, a jack head mounted on said piston rod, said jack head comprising a shelf portion projecting outwardly of said rod and a flange portion projecting upwardly from said shelf portion, said flange portion having an upwardly opening, generally vertical slot therein and tapered recesses disposed on opposite edges of said slot on one side of said flange portion, said slot and recesses receiving links of a looped chain therein for interlocking the chain to said jack head, the chain being adapted to encircle a pole in gripping coaction therewith, for lifting the pole upwardly from implanted condition in the ground upon upward actuation of said piston rod, said base assembly comprising a generally U-shaped structure multi-piece in plan view for partially encompassing a pole, and including pivotal collar means loosely encircling the upper end of said cylinder, strut means extending diagonally upwardly from said U-shaped structure and rotatably mounting said collar means in detachable relation thereon along a generally horizontally extending axis passing through said strut means, said strut means being detachable from said U-shaped structure, and lug structure on said base assembly, means on the lower end of said cylinder coacting with said lug structure on said base assembly for interlocking said ram in a generally horizontal direction with respect to said base assembly but permitting universal tilting of said ram with respect to said base assembly, said means on said cylinder comprising spaced lugs projecting downwardly from the underside of said cylinder, said lugs holding the underside of said cylinder in spaced relationship to said lug structure but interlocking said cylinder to said base assembly in a generally horizontal plane.

4. A portable pole jack comprising a base, a reciprocal fluid powered ram mounted generally vertically on said base, said ram including a piston and a cylinder, a piston rod projecting outwardly of the upper end of said cylinder, a jack head mounted on said piston rod, means on said jack head for interlocking coaction with a chain adapted to encircle the pole, for lifting the chain upwardly upon upward movement of the jack head, thereby pulling the pole from implanted relation in the ground, said means on said jack head comprising a generally vertical slot for receiving a link of the chain therein and including beveled recess means adjacent said slot on opposite sides thereof for receiving another link of the chain for holding the same in transversely oriented relation with respect to the first link and locking the chain to the said head, said base comprising a generally U-shaped structure in plan view for partially encompassing a pole, and means detachably connecting the ram to the base, said means including struts extending upwardly from said U-shaped structure to opposite sides of the ram and a collar detachably connected to said struts, said collar encircling said ram and including means providing for rotational movement of the collar with respect to said struts and about a generally horizontal axis passing through said struts, and lug means depending from the underside of said cylinder, spacing the latter from said base.

5. A portable pole jack in accordance with claim 4, wherein said collar loosely encircles said ram and wherein said lug means includes a pair of spaced lugs projecting from the underside of the cylinder into engagement with said U-shaped base structure, and other lug means on said U-shaped structure coacting with the first mentioned lug means for interlocking the ram to the base in a horizontal direction but permitting relative tilting between the ram and the base.

References Cited in the file of this patent
UNITED STATES PATENTS

| | | |
|---|---|---|
| 2,493,978 | Kromer | Jan. 10, 1950 |
| 2,625,352 | Sykes et al. | Jan. 13, 1953 |
| 2,757,903 | Bill | Aug. 7, 1956 |